(12) United States Patent
Sumi et al.

(10) Patent No.: US 9,670,998 B2
(45) Date of Patent: Jun. 6, 2017

(54) OSCILLATION TOOL

(75) Inventors: Atsushi Sumi, Hitachinaka (JP); Shota Takeuchi, Hitachinaka (JP)

(73) Assignee: HITACHI KOKI CO., LTD., Tokyo (JP)

( * ) Notice: Subject to any disclaimer, the term of this patent is extended or adjusted under 35 U.S.C. 154(b) by 337 days.

(21) Appl. No.: 14/129,237

(22) PCT Filed: Aug. 30, 2012

(86) PCT No.: PCT/JP2012/005505
§ 371 (c)(1),
(2), (4) Date: Dec. 24, 2013

(87) PCT Pub. No.: WO2013/046541
PCT Pub. Date: Apr. 4, 2013

(65) Prior Publication Data
US 2014/0123785 A1  May 8, 2014

(30) Foreign Application Priority Data

Sep. 28, 2011 (JP) .................................. 2011-213180

(51) Int. Cl.
*B24B 23/04* (2006.01)
*B27B 19/00* (2006.01)
(Continued)

(52) U.S. Cl.
CPC ............ *F16H 21/40* (2013.01); *B23D 51/16* (2013.01); *B24B 23/04* (2013.01); *B27B 19/006* (2013.01); *Y10T 74/18216* (2015.01)

(58) Field of Classification Search
CPC ........ B24B 23/04; B24B 47/16; B27B 19/006; F16H 21/40; F16H 21/42; B23D 51/16
(Continued)

(56) References Cited

U.S. PATENT DOCUMENTS 4,798,024 A * 1/1989 Grimm ..................... B24B 9/00
451/121
5,533,926 A * 7/1996 Nemazi .................. B24B 23/04
451/344

(Continued)

FOREIGN PATENT DOCUMENTS

| GB | 2 408 708 A | 6/2005 |
|---|---|---|
| JP | 2010-063808 A | 3/2010 |
| WO | 2012/041211 A1 | 4/2012 |

OTHER PUBLICATIONS

Japanese Office Action issued in Japanese Application 2011-213180 dated Jun. 2, 2015, with English Translation.
(Continued)

*Primary Examiner* — Stephen Choi
*Assistant Examiner* — Evan MacFarlane
(74) *Attorney, Agent, or Firm* — McDermott Will & Emery LLP (57) ABSTRACT

An oscillation tool includes a grip-portion housing and a front-side housing which are fitted to each other so as to freely slide on each other. In the case that a driving unit and an oscillating unit are distanced from each other, the oscillating shaft is oscillated at a narrow amplitude. On the other hand, in a case that the driving unit and the oscillating unit are approached by each other, the oscillating shaft is oscillated at a wide amplitude.

5 Claims, 7 Drawing Sheets

(51) Int. Cl.
*F16H 21/40* (2006.01)
*B23D 51/16* (2006.01)

(58) Field of Classification Search
USPC ............ 30/392–394; 606/178; 451/356, 357, 451/344; 173/49, 109, 122, 217, 29
See application file for complete search history.

(56) References Cited

U.S. PATENT DOCUMENTS

| | | | | |
|---|---|---|---|---|
| 5,993,304 A | * | 11/1999 | Eriksson | ............... B23Q 5/027 451/356 |
| 2005/0126803 A1 | * | 6/2005 | Zaiser | ................... B23Q 5/027 173/216 |
| 2006/0009796 A1 | * | 1/2006 | Carusillo | ............... A61B 17/14 606/178 |
| 2011/0036609 A1 | * | 2/2011 | Blickle | ................ B24B 23/028 173/213 |

OTHER PUBLICATIONS

International Search Report (in English) issued in International Application No. PCT/JP2012/005505 dated Nov. 21, 2012.

\* cited by examiner

OSCILLATION TOOL

RELATED APPLICATIONS

This application is the U.S. National Phase under 35 U.S.C. §371 of International Application No. PCT/JP2012/005505, filed on Aug. 30, 2012, which in turn claims the benefit of Japanese Application No. 2011-213180, filed on Sep. 28, 2011, the disclosures of which Applications are incorporated by reference herein.

TECHNICAL FIELD

The present invention relates to an oscillation tool provided with an oscillating shaft to which a tip tool is attached.

BACKGROUND ART

For example, as a cutting tool for cutting wood, plasterboard, or others, a cutting tool in which rotary motion of a motor is converted to reciprocating motion of a blade has been developed (see Patent Literature 1). While the cutting tool described in Patent Literature 1 is a cutting tool in which a blade with a cutting edge on a side portion thereof is reciprocally moved in a longitudinal direction, an oscillation tool in which a blade with a cutting edge on an end portion thereof in a longitudinal direction is reciprocally swung in a width direction has been developed in recent years. Such an oscillation tool includes an oscillating shaft to which a blade or others is attached, and the oscillating shaft is rotated by motor power as reciprocating by a predetermined angle. Note that, the tip tool attached to the oscillating shaft is a blade used for cutting wood, plasterboard, plastic, metal, or others. Also, another tip tool is a sanding pad used for polishing wood, plastic, metal, or others. Further, still another tip tool is a scraper or others used for removing adhesion substances or stains on a floor or others.

CITATION LIST

Patent Literature

PTL 1: Japanese Patent Application Laid-Open Publication No. 2010-63808

SUMMARY OF INVENTION

Technical Problem

Incidentally, the above-described oscillation tool has a structure in which the oscillating shaft is reciprocated by a certain angle, that is, at certain amplitude, and therefore, it is impossible to change the amplitude of the oscillating shaft. For example, in a case that wood is cut by oscillating the blade, when the blade is abutted against the wood to be positioned, it is required to oscillate the blade at a narrow amplitude so as to be easily positioned. Meanwhile, in a procedure of cutting the wood by the blade, it is required to oscillate the blade at a wide amplitude so as to ensure a cutting speed. As described above, in the oscillation tool in which the tip tool is oscillated, a structure in which the amplitude of the oscillating shaft is changed depending on a usage condition has been obtained.

A preferred aim of the present invention is to change an amplitude of an oscillating shaft to which a tip tool is attached.

Solution to Problem

One embodiment of the present invention includes: a driving unit including a driving source for driving and rotating a driving shaft with an eccentric shaft provided to a tip thereof; a swing arm including a housing portion on one end side of the swing arm, with which the eccentric shaft engages; and an oscillating unit including an oscillating shaft connected to the swing arm, and an amplitude of the oscillating shaft is changed by coupling the driving unit and the oscillating unit to each other so as to freely move relative to each other in a shaft direction of the driving shaft and changing positions of the eccentric shaft on the driving unit side and the housing portion on the oscillating unit side.

In another embodiment of the present invention, a spring member for biasing the driving unit and the oscillating unit in a direction so as to be distanced from each other is provided between the driving unit and the oscillating unit.

Still another embodiment of the present invention includes a locking mechanism for fixing a distance between the driving unit and the oscillating unit is provided.

Still another embodiment of the present invention includes a bearing whose inner ring is fixed at the eccentric shaft, and an outer ring of the bearing contacts with the housing portion of the swing arm so as to slide thereon.

In still another embodiment of the present invention, a tool attaching portion to which a tip tool is attached is provided to a tip end of the oscillating shaft which protrudes from the oscillating unit.

Advantageous Effects of Invention

In accordance with the present invention, the driving unit and the oscillating unit are coupled to each other so as to freely move relative to each other, and therefore, the positions of the eccentric shaft on the driving unit side and the housing portion on the oscillating unit side can be changed so that the amplitude of the oscillating shaft is changed.

DESCRIPTION OF EMBODIMENTS

Figure 1:
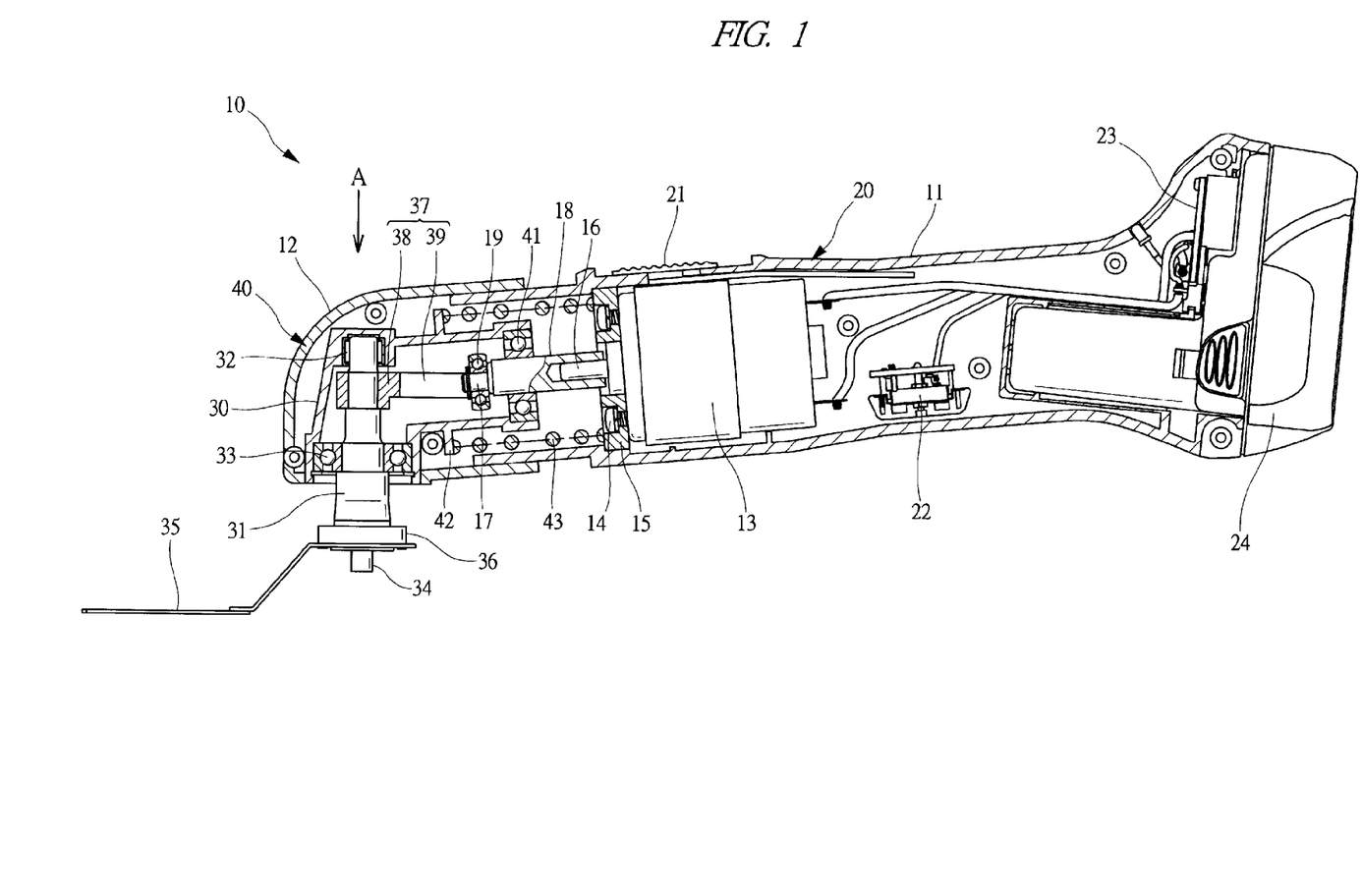
FIG. 1 is a cross-sectional view illustrating an oscillation tool according to one embodiment of the present invention.
Figure 2:
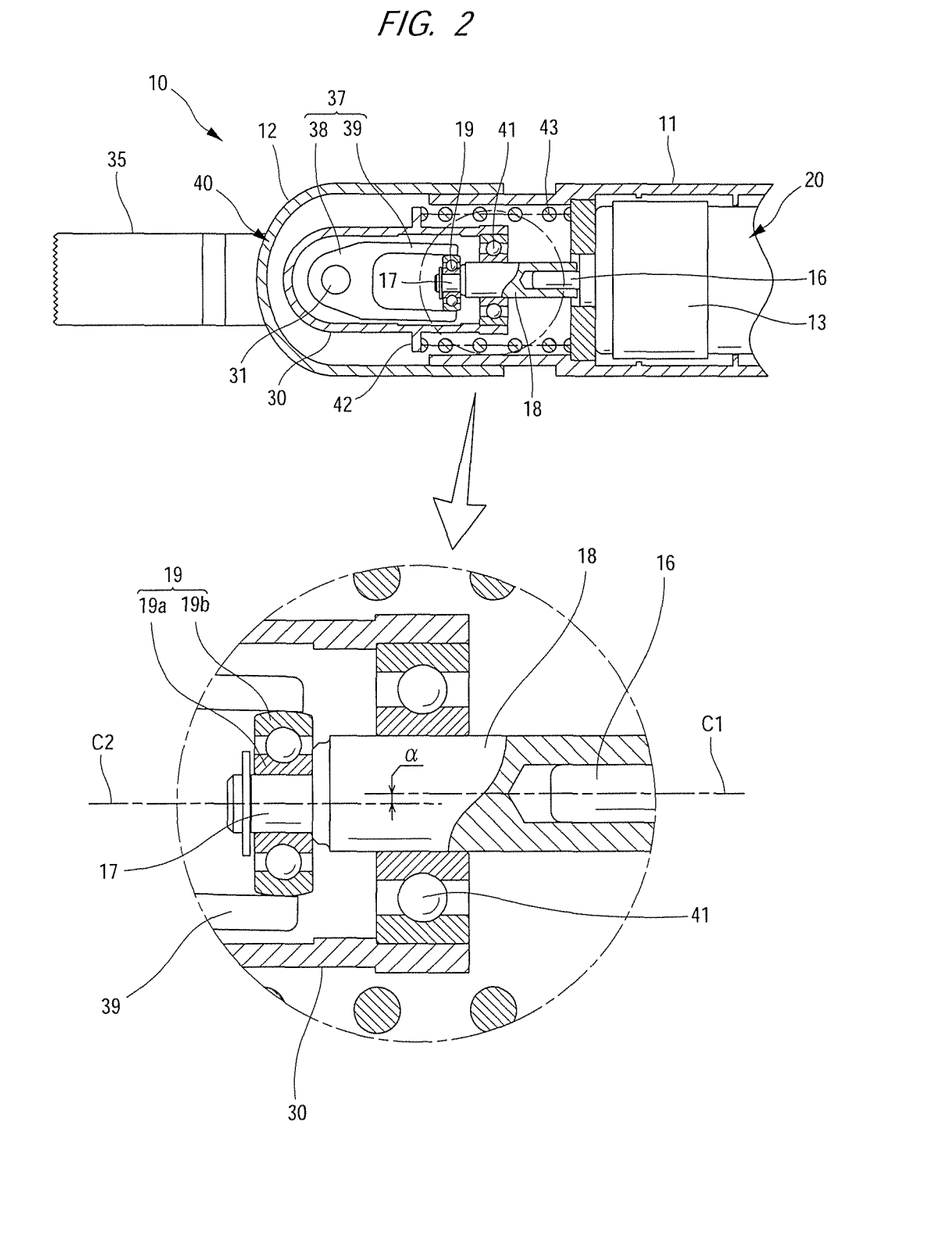
FIG. 2 is a cross-sectional view illustrating a part of the oscillation tool viewed from an arrow A direction of FIG. 1.

Hereinafter, embodiments of the present invention will be explained in detail with reference to the drawings. FIG. 1 is a cross-sectional view illustrating an oscillation tool 10 according to one embodiment of the present invention. And, FIG. 2 is a cross-sectional view illustrating a part of the oscillation tool 10 viewed from an arrow A direction of FIG. 1. As illustrated in FIG. 1, the oscillation tool 10 includes: a grip-portion housing 11 to be gripped by an operator; and a front-side housing 12 fitted to a tip of this grip-portion housing 11 so as to be freely slide thereto. An electric motor 13 serving as a driving source is housed in the grip-portion housing 11, and the electric motor 13 is fixed at a barrier wall 15 of the grip-portion housing 11 by an attachment screw 14. As illustrated in FIGS. 1 and 2, a spindle (driving shaft) 18 having an eccentric shaft 17 at a tip thereof is fixed at a motor shaft (driving shaft) 16 of the electric motor 13. As illustrated in the enlarged view of FIG. 2, a center axis C1 of the spindle 18 (motor shaft 16) and a center axis C2 of the eccentric shaft 17 in parallel thereto are distanced from each other by a distance α. That is, by driving to rotate the spindle 18 by the electric motor 13, the eccentric shaft 17 is revolved around the center axis C1 along a circular trajectory with a radius of α. Moreover, an inner ring 19a of a bearing 19 is fixed at the eccentric shaft 17 of the spindle 18 so as to fit thereto. A driving unit 20 of the oscillation tool 10 is configured of such an electric motor 13 provided with the spindle 18 and grip-portion housing 11 for supporting this. Note that the grip-portion housing 11 is provided with: a main switch 21 operated by the operator when the oscillation tool 10 is activated; a speed controller 22 operated by the operator when the number of revolutions of the motor is adjusted; a control substrate 23 for controlling a driving current to be supplied to the electric motor 13; and a battery pack 24 in which a storage battery is housed therein.

Also, as illustrated in FIGS. 1 and 2, an inner case 30 is housed in the front-side housing 12, and an oscillating shaft 31 is supported by a pair of bearings 32 and 33 in the inner case 30. Moreover, a tool attaching portion 36 is formed at a tip of the oscillating shaft 31 which protrudes from the front-side housing 12 and the inner case 30. A blade (tip tool) 35 is attached to this tool attaching portion 36 by using a fixing screw 34. Further, a swing arm 37 which extends toward the spindle 18 side is fixed at a base end of the oscillating shaft 31. The swing arm 37 is provided with: a fitting portion 38 fixed at the oscillating shaft 31; and a pair of arm pieces 39 which extend from the fitting portion 38 toward the spindle 18 side so as to be branched into two parts. Inside these arm pieces 39, an outer ring 19b of the bearing 19 fixed at the eccentric shaft 17 is housed so as to freely slide. That is, the pair of arm pieces 39 provided in the swing arm 37 function as a housing portion for housing the eccentric shaft 17. In this manner, the arm pieces 39 are provided on one end side of the swing arm 37, and the fitting portion 38 is provided on the other end side of the swing arm 37. The oscillating shaft 31 and the spindle 18 are coupled to each other through such a swing arm 37. And, the rotary motion of the spindle 18 (revolving motion of the eccentric shaft 17) is converted to oscillation motion which reciprocally rotates the oscillating shaft 31 and the blade 35 by a predetermined angle. An oscillating unit 40 of the oscillation tool 10 is configured of such oscillating shaft 31, swing arm 37, inner case 30, and front-side housing 12. Note that a bearing 41 for supporting the spindle 18 is provided in the inner case 30, and the spindle 18 is freely moved in the shaft direction relative to the bearing 41.

Figure 3:
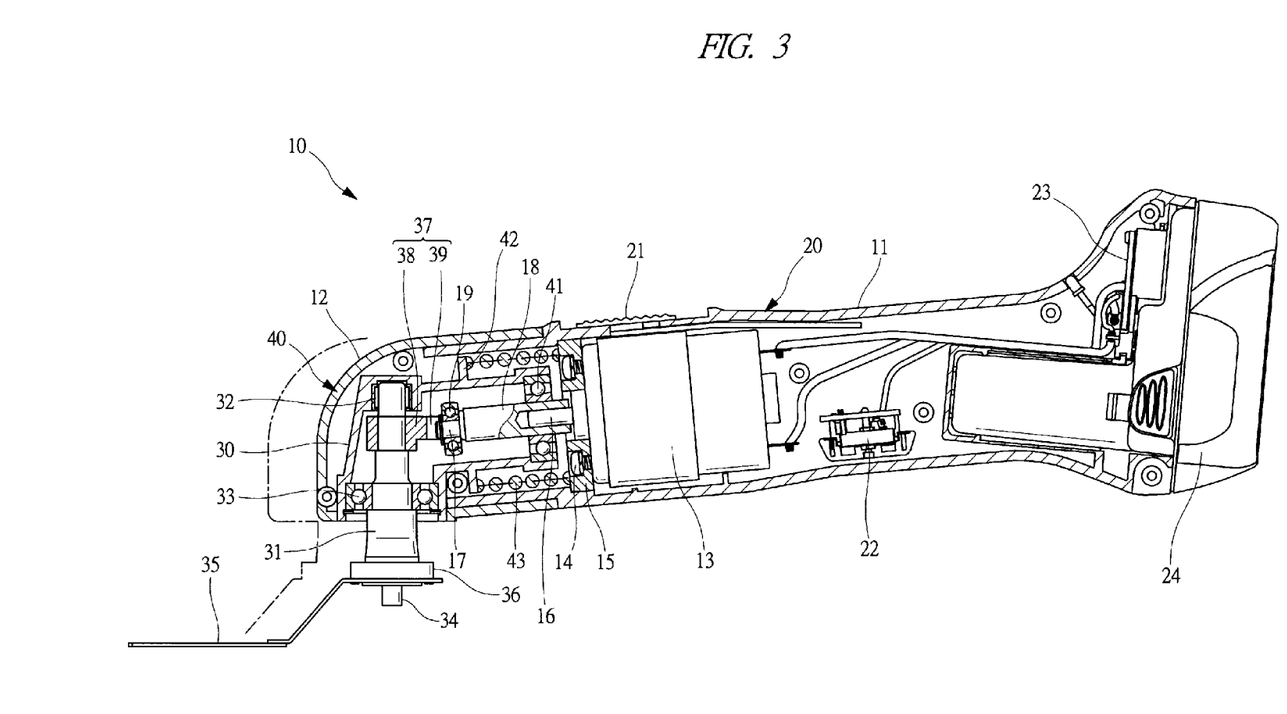
FIG. 3 is a cross-sectional view illustrating the oscillation tool shortened in a longitudinal direction.

Moreover, a flange portion 42 is formed in the inner case 30 of the oscillating unit 40. Between the flange portion 42 and the barrier wall 15 of the grip-portion housing 11, a coil spring (spring member) 43 is attached. The coil spring 43 biases the flange portion 42 and the barrier wall 15 in a direction of distancing them from each other, that is, a direction of distancing the driving unit 20 and the oscillating unit 40 from each other. Here, FIG. 3 is a cross-sectional view illustrating the oscillation tool 10 shortened in the longitudinal direction. As described above, the grip-portion housing 11 and the front-side housing 12 are fitted to each other so as to freely slide relative to each other. In this manner, as illustrated in FIG. 3, when thrust force is applied to the oscillation tool 10 in the longitudinal direction, the driving unit 20 and the oscillating unit 40 are approached by each other as compressing the coil spring 43. That is, the driving unit 20 and the oscillating unit 40 are coupled to each other in the shaft direction of the spindle 18 so as to freely move relative to each other. In this manner, a distance between the driving unit 20 and the oscillating unit 40 can be changed in accordance with a magnitude of the thrust force applied to the driving unit 20 and the oscillating unit 40. Note that a dashed line illustrated in FIG. 3 indicates an outline of the oscillating unit 40 obtained when the driving unit 20 and the oscillating unit 40 are distanced from each other. Moreover, while the driving unit 20 and the oscillating unit 40 are distanced from each other by the coil spring 43, the relative movement between the front-side housing 12 and the grip-portion housing 11 is limited by an engaging portion which is not illustrated. Note that a state illustrated in FIG. 1 indicates a state of the farthest distance between the driving unit 20 and the oscillating unit 40.

Figure 4A:
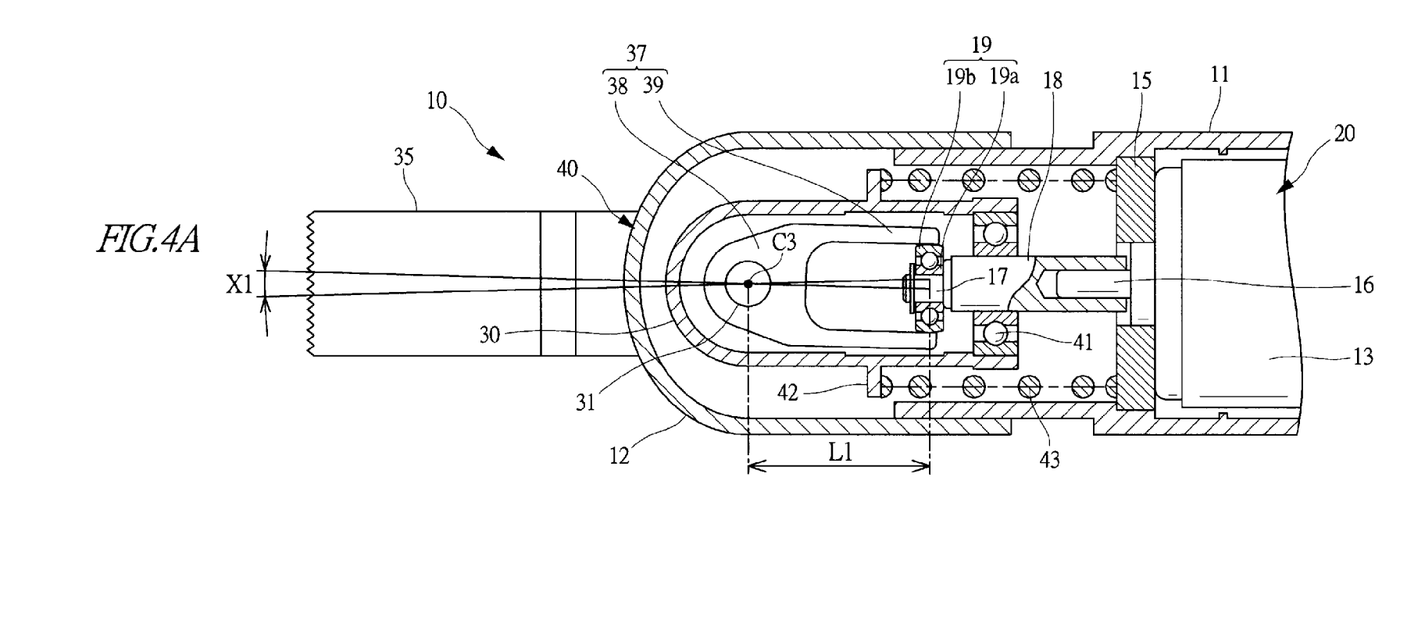
FIG. 4A is an explanatory diagram illustrating an oscillating state of a blade obtained when a driving unit and an oscillating unit are distanced from each other.
Figure 4B:
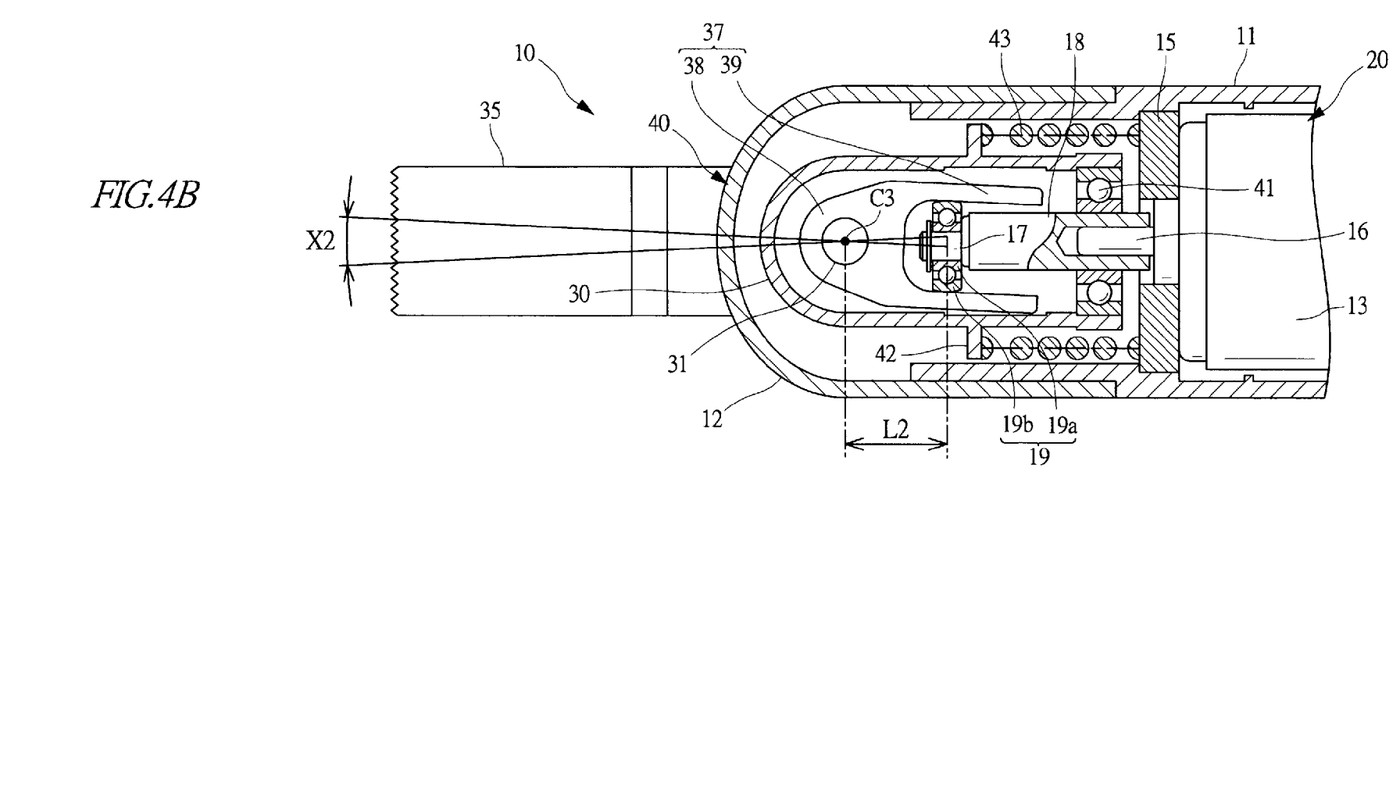
FIG. 4B is an explanatory diagram illustrating an oscillating state of the blade obtained when the driving unit and the oscillating unit are approached by each other.

FIG. 4A is an explanatory diagram illustrating an oscillating state of the blade 35 obtained when the driving unit 20 and the oscillating unit 40 are distanced from each other. Also, FIG. 4B is an explanatory diagram illustrating an oscillating state of the blade 35 obtained when the driving unit 20 and the oscillating unit 40 are approached by each other. As illustrated in FIG. 4A, when the driving unit 20 and the oscillating unit 40 are distanced from each other, the bearing 19 which contacts to slide onto the arm pieces 39 of the swing arm 37 moves in a direction so as to be distanced from the oscillating shaft 31. At this time, a distance between a center axis C3 of the oscillating shaft 31 and a contact point of the bearing 19 onto the arm pieces 39 is L1. On the other hand, as illustrated in FIG. 4B, when the driving unit 20 and the oscillating unit 40 are approached by each other, the bearing 19 which contacts with and slides in the arm pieces 39 of the swing arm 37 moves in a direction so as to approach the oscillating shaft 31. At this time, the distance between the center axis C3 of the oscillating shaft 31 and the contact point of the bearing 19 onto the arm pieces 39 is L2 which is shorter than the above-described L1.

Here, the amplitude of the eccentric shaft 17 (bearing 19) is constant. Therefore, as illustrated in FIGS. 4A and 4B, when the contact point of the bearing 19 onto the arm pieces 39 and the center axis C3 of the oscillating shaft 31 are distanced from each other (by the distance L1), the oscillating shaft 31 and the blade 35 are oscillated at a narrow amplitude X1. On the other hand, when the contact point of the bearing 19 onto the arm pieces 39 and the center axis C3 of the oscillating shaft 31 are approached by each other (by the distance L2), the oscillating shaft 31 and the blade 35 are oscillated at an amplitude X2 which is wider than the amplitude X1. In this manner, by changing a positional relationship between the swing arm 37 and the eccentric shaft 17, the amplitude between the oscillating shaft 31 and the blade 35 can be continuously changed between the X1 and the X2.

Besides, the coil spring 43 is provided between the driving unit 20 and the oscillating unit 40. Therefore, the amplitude of the blade 35 can be automatically changed in accordance with an operating condition. That is, in a stage that no operation load is applied to the oscillation tool 10, the driving unit 20 and the oscillating unit 40 are distanced from each other, so that the blade 35 can be oscillated at the narrow amplitude X1. As described above, by oscillating the blade 35 at the narrow amplitude X1, the positioning when the blade 35 abuts against the wood or others can be easily achieved. Moreover, by oscillating the blade 35 at the narrow amplitude X1, the safety of the oscillation tool 10 can be enhanced. On the other hand, in a stage that the operation load is applied to the oscillation tool 10 by contacting the blade 35 with the wood or others, the driving unit 20 and the oscillating unit 40 are approached by each other in accordance with the operation load, so that the amplitude of the blade 35 is gradually widened from the X1 to the X2. In this manner, by oscillating the blade 35 at the wide amplitude X2, a cutting speed in cutting the wood or others can be increased.

Figure 5:
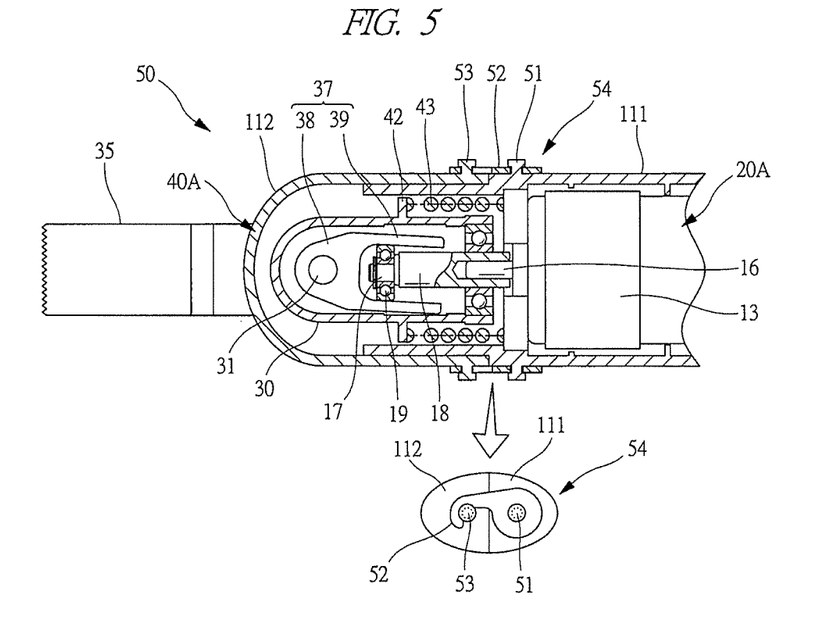
FIG. 5 is a cross-sectional view illustrating a part of an oscillation tool according to another embodiment of the present invention.

In the above-described explanation, the distance between the driving unit 20 and the oscillating unit 40 is changed in accordance with the operation load. However, it is not limited to this, and the distance between the driving unit 20 and the oscillating unit 40 may be fixed by using a locking mechanism. Here, FIG. 5 is a cross-sectional view illustrating a part of an oscillation tool 50 according to another embodiment of the present invention. Note that, in FIG. 5, the same members as those illustrated in FIG. 2 are denoted by the same reference symbols, and the description thereof will be omitted. As illustrated in FIG. 5, a pair of supporting pins 51 are provided to the grip-portion housing 111, and engaging hooks 52 are attached to these supporting pins 51. Moreover, a pair of engaging pins 53 are provided to the front-side housing 112 so that the engaging hooks 52 of the grip-portion housing 111 can be hooked on these engaging pins 53. In this manner, a locking mechanism 54 is configured of these supporting pins 51, engaging hooks 52, and engaging pins 53. And, the engaging hooks 52 are hooked on the engaging pins 53 under the state that the driving unit 20A and the oscillating unit 40A are approached by each other. In this manner, the driving unit 20A and the oscillating unit 40A can be fixed at a position resulting in the maximum amplitude between the oscillating shaft 31 and the blade 35. Note that, in the drawings, the driving unit 20A and the oscillating unit 40A are fixed at the position resulting in the maximum amplitude between the oscillating shaft 31 and the blade 35. However, it is not limited to this, and the driving unit 20A and the oscillating unit 40A may be fixed at a different position. Moreover, it is needless to say that a structure of the locking mechanism 54 is not limited to the illustrated structure, and a locking mechanism having a different structure may be adopted.

Figure 6:
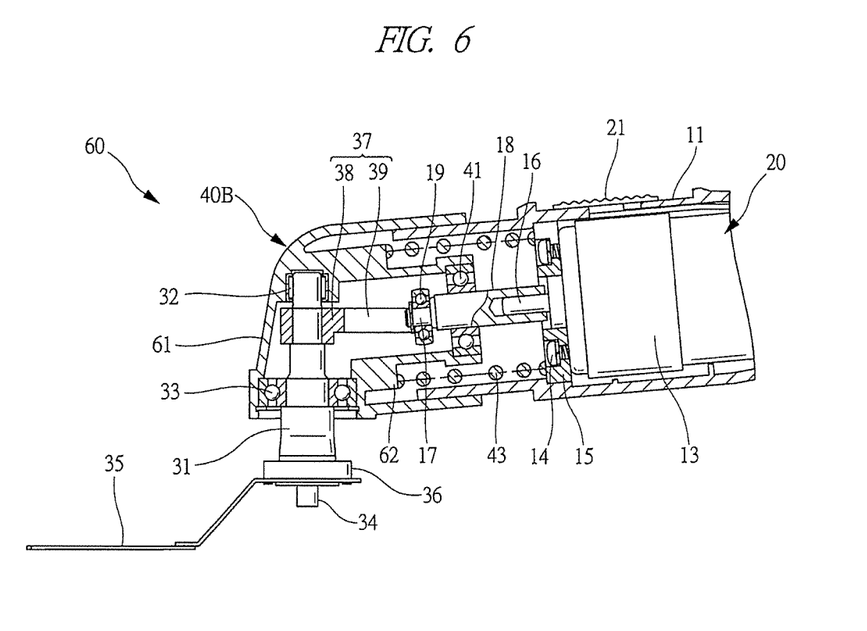
FIG. 6 is a cross-sectional view illustrating a part of an oscillation tool according to still another embodiment of the present invention.

Moreover, in the case illustrated in FIG. 1, the front-side housing 12 and the inner case 30, which configure the oscillating unit 40, are individually formed. However, they are not limited to this, the front-side housing 12 and the inner case 30 may be monolithically formed. Here, FIG. 6 is a cross-sectional view illustrating a part of an oscillation tool 60 according to still another embodiment of the present invention. FIG. 6 shows the oscillating unit 40B. Note that, in FIG. 6, the same members as those illustrated in FIG. 1 are denoted by the same reference symbols, and the description thereof will be omitted. As illustrated in FIG. 6, the oscillating shaft 31 provided with the swing arm 37 is supported by a front-side housing 61 fitted to the grip-portion housing 11 so as to freely slide thereto. Moreover, a spring receiving portion 62 is formed in the front-side housing 61, and the coil spring 43 is attached between this spring receiving portion 62 and the barrier wall 15 of the grip-portion housing 11. In this manner, even if the front-side housing 12 and the inner case 30 of FIG. 1 are monolithically formed, the oscillation tool can be functioned similarly to the above-described oscillation tool 10.

Figure 7A:
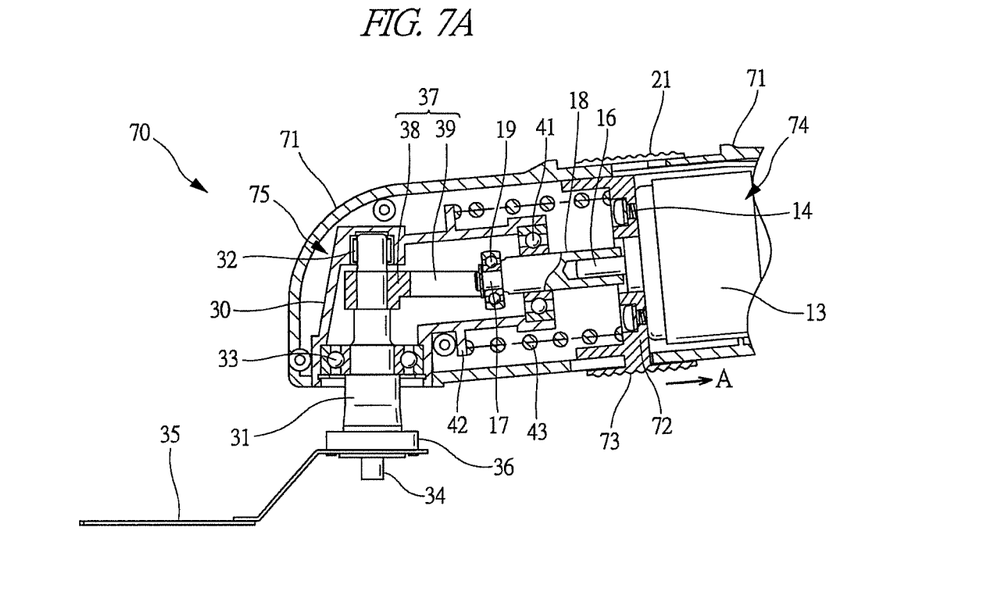
FIG. 7A is a cross-sectional view illustrating a part of an oscillation tool according to still another embodiment of the present invention.
Figure 7B:
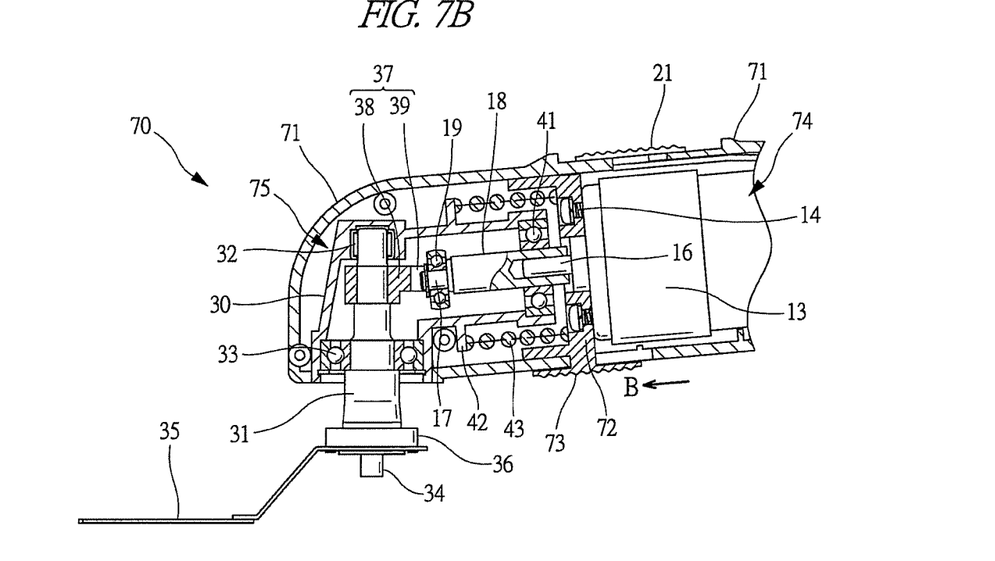
FIG. 7B is a cross-sectional view illustrating a part of the oscillation tool according to still another embodiment of the present invention.

Moreover, in the above-described explanation, the grip-portion housing 11 and the front-side housing 12 are fitted to each other so as to freely slide to each other. However, it is not limited to this, the electric motor 13 may be moved inside the oscillation tool. Here, FIGS. 7A and 7B are cross-sectional views each illustrating a part of an oscillation tool 70 according to still another embodiment of the present invention. Note that, in FIGS. 7A and 7B, the same members as those illustrated in FIG. 1 are denoted by the same reference symbols, and the description thereof will be omitted. As illustrated in FIG. 7A, in the oscillation tool 70, a housing 71 monolithically formed from a front end thereof to a rear end thereof is provided. That is, in the oscillation tool 70, the housing 71 obtained by monolithically forming the grip-portion housing 11 and the front-side housing 12 illustrated in FIG. 1 is provided. A motor attaching plate 72 is housed inside this housing 71 so as to freely move therein, and the electric motor 13 is fixed at this motor attaching plate 72. Moreover, an operation lever 73 which is exposed outside is fixed at the motor attaching plate 72, and the operator slides the operation lever 73, so that the electric motor 13 can be moved in the shaft direction of the spindle 18. Note that, in the oscillation tool 70, a driving unit 74 is configured of the electric motor 13, the spindle 18, and the motor attaching plate 72. Moreover, an oscillating unit 75 is configured of the oscillating shaft 31, the swing arm 37, and the inner case 30.

As illustrated in FIG. 7A, by sliding the operation lever 73 in a direction of an arrow A, the driving unit 74 and the oscillating unit 75 can be distanced from each other, so that the blade 35 can be oscillated at a narrow amplitude. On the other hand, as illustrated in FIG. 7B, by sliding the operation lever 73 in a direction of an arrow B, the driving unit 74 and the oscillating unit 75 can be approached by each other, so that the blade 35 can be oscillated at a wide amplitude. Also, in a case that the electric motor 13 is moved by using the operation lever 73, it is desired to provide a locking mechanism for maintaining a slide position of the operation lever 73. That is, in the case that the electric motor 13 is moved by using the operation lever 73, it is desired to provide the locking mechanism for maintaining a position of the electric motor 13 inside the housing 71.

It is needless to say that the invention is not limited to the above-described embodiments, and various modifications and alterations can be made within the scope of the present invention. For example, the illustrated oscillation tool 10 is a cordless-type oscillation tool 10 to which the battery pack 24 is attached. However, it is not limited to this, and the present invention may be applied to an oscillation tool to be used by plugging its power supply cord in a socket. Moreover, the tip tool is not limited to the blade 35 used for cutting wood, plasterboard, plastic, metal, or others. For example, as the tip tool, a sanding pad used for polishing wood, plastic, metal, or others may be used. Moreover, for example, as the tip tool, a scraper used for removing adhesion matters and stains on a floor or others may be used. Further, in the above-described explanation, the electric motor 13 is used as the driving source. However, it is not limited to this, and an engine or an air motor may be used as the driving source.

The invention claimed is:

1. An oscillation tool comprising:
a driving unit including a driving motor for driving and rotating a driving shaft with an eccentric shaft provided to a tip of the driving shaft;
a swing arm including a housing portion on one end side of the swing arm, the eccentric shaft engaging with the housing portion within which the eccentric shaft is slidable from a default position in the housing portion along a rotation axis of the driving shaft; and
an oscillating unit including an oscillating shaft connected to the swing arm; and
a spring member between the driving unit and the oscillating unit for biasing the driving unit and the oscillating unit in a direction away from each other along the rotation axis of the driving shaft in order to return the eccentric shaft to the default position in the housing portion of the swing arm, wherein
when opposing forces towards each other act on the driving unit and the oscillation unit and, the eccentric shaft slides from the default position in the housing portion,
when no opposing forces act on the driving unit and the oscillation unit, the eccentric shaft slides and returns to the default position in the housing portion, and
the spring member allows the driving unit and the oscillating unit to change their relative position along the rotation axis, causing the eccentric shaft to slide within the housing portion of the swing arm along the rotation axis, in order to change an amplitude of the oscillating shaft.

2. The oscillation tool according to claim 1, wherein
the oscillation tool includes a locking mechanism for fixing a distance between the driving unit and the oscillating unit, and
the locking mechanism includes a pin provided to the oscillating unit and a hook provided to the driving unit, the hook being configured to engage with the pin.

3. The oscillation tool according to claim 1, wherein the oscillation tool includes a bearing whose inner ring is fixed at the eccentric shaft, and an outer ring of the bearing contacts with the housing portion of the swing arm so as to slide thereon.

4. The oscillation tool according to claim 1, wherein a tool attaching portion to which a tip tool is attached is provided to a tip end of the oscillating shaft which protrudes from the oscillating unit.

5. The oscillation tool according to claim 1, further comprising a lock configured to lock the driving unit and the oscillating unit together.

* * * * *